United States Patent [19]

Ichikawa et al.

[11] Patent Number: 5,351,227
[45] Date of Patent: Sep. 27, 1994

[54] OPTICAL RECORDING/REPRODUCING APPARATUS IN WHICH DATA WILL NOT BECOME UNABLE TO BE READ OUT IN CASE AN SDL FAILS TO BE RENEWED

[75] Inventors: Hitoshi Ichikawa, Machida; Osao Miyazawa, Hachioji; Masanobu Nakamura, Hoya, all of Japan

[73] Assignee: Olympus Optical Co., Ltd., Tokyo, Japan

[21] Appl. No.: 661,957

[22] Filed: Feb. 27, 1991

[30] Foreign Application Priority Data

Feb. 28, 1990 [JP] Japan .................. 2-51127

[51] Int. Cl.$^5$ .......................... G11B 7/00; G11B 3/90
[52] U.S. Cl. ........................................ 369/58; 369/54
[58] Field of Search ............... 369/58, 54, 59, 48, 369/47, 32, 49, 28; 360/53, 60, 51, 32, 31

[56] References Cited

U.S. PATENT DOCUMENTS

| | | | |
|---|---|---|---|
| 4,736,352 | 4/1988 | Satoh et al. | 369/59 |
| 4,774,700 | 9/1988 | Satoh et al. | 369/58 |
| 4,821,254 | 4/1989 | Satoh et al. | 369/54 |
| 4,833,663 | 5/1989 | Satoh et al. | 369/32 |
| 4,833,665 | 5/1989 | Tokumitsu et al. | 369/58 |
| 4,835,757 | 5/1989 | Abiko | 369/58 |
| 4,841,498 | 6/1989 | Sugimura et al. | 369/58 |
| 4,969,139 | 11/1990 | Azumatani et al. | 369/58 |
| 4,984,230 | 1/1991 | Satoh et al. | 369/54 |
| 5,132,956 | 7/1992 | Ichikawa | 369/58 |

OTHER PUBLICATIONS

ISO/IEC JTC1/SC23N292, Oct. 25, 1989.

Japanese Laid-Open No. 60-205741, Oct. 17, 1985.

*Primary Examiner*—Aristotelis Psitos
*Assistant Examiner*—Thang V. Tran
*Attorney, Agent, or Firm*—Armstrong, Westerman, Hattori, McLeland & Naughton

[57] ABSTRACT

An optical recording/reproducing apparatus including an optical recording medium having an alternating area in which information may be recorded instead of the normal recording area when the information fails to be recorded in the normal recording area, and a plurality of control regions in which position information of the recording area having failed to record information and position information of the alternating area in which the information failed to be recorded is recorded instead of the recording area. The apparatus records the information in a predetermined information recording area of the optical recording area, reproduces the predetermined information, collates the information intended to be recorded with the reproduced predetermined information, and judges that the predetermined information was not correctly recorded in the predetermined recording area. The apparatus also performs alternating processing to record the information in the alternating area in case it is judged that the information was not correctly recorded, and carries out a renewal operation with at least one region remaining among a plurality of the control regions, renewing remaining control regions when the renewal operations succeed and not renewing the remaining control regions when the renewal operation fails.

7 Claims, 10 Drawing Sheets

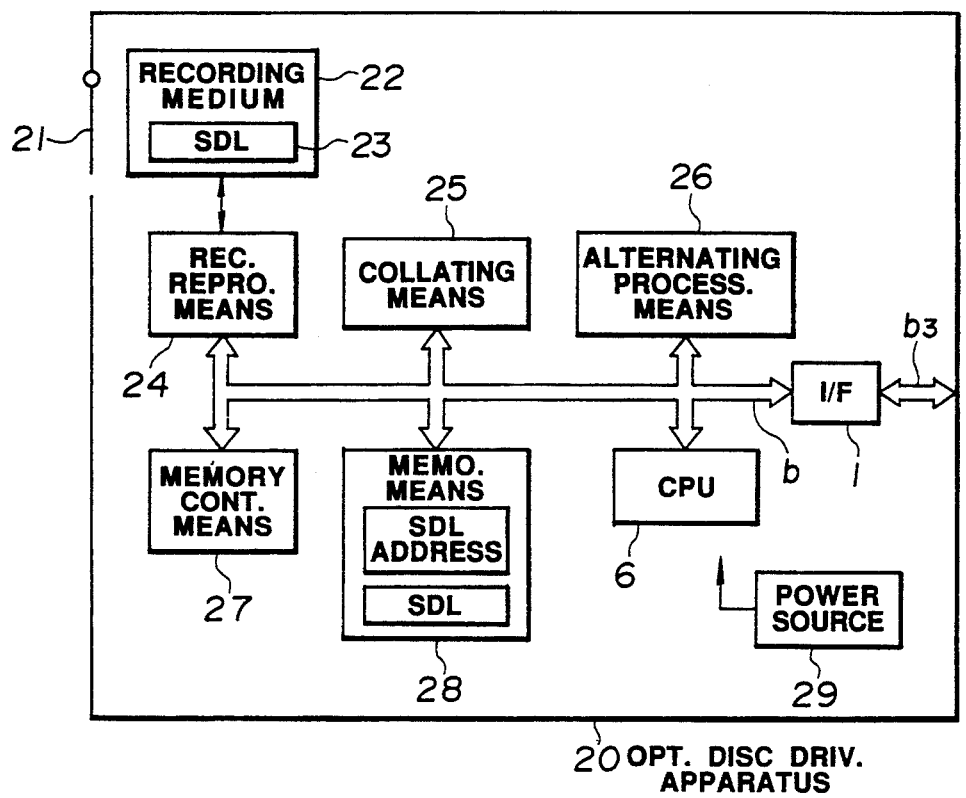
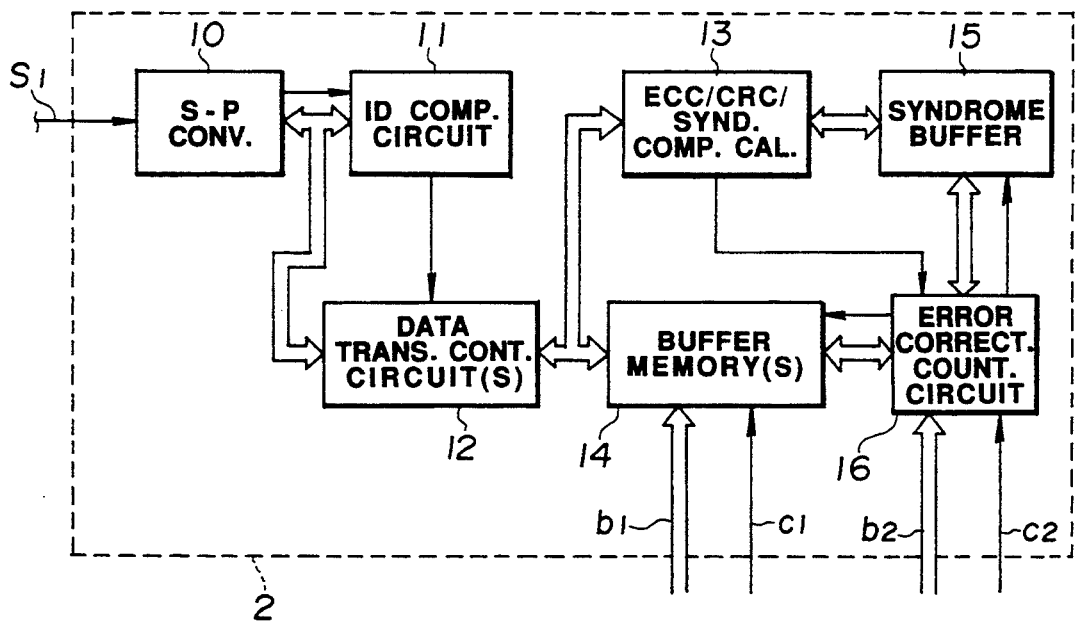

OPTICAL RECORDING/REPRODUCING APPARATUS IN WHICH DATA WILL NOT BECOME UNABLE TO BE READ OUT IN CASE AN SDL FAILS TO BE RENEWED

BACKGROUND OF THE INVENTION

1. Field of the Invention

This invention relates to improvements in an optical recording/reproducing apparatus wherein it is judged whether an optical recording medium has been used or not and data are recorded or reproduced.

2. Description of Related Art

Recently there has come to be practiced an optical recording/reproducing apparatus wherein, by condensing and radiating a light beam, for example, of a laser light on an optical recording medium, for example, through an optical system lens, data are recorded in the recording medium in which, for example, a hole is made or, by the reflected light from the above described hole, the recorded data can be reproduced. In the following, a disc-like optical disc shall be described as an example of the above mentioned recording medium.

The above mentioned optical disc is formed of a synthetic resin or the like to be substantially like a disc of a diameter, for example, of about 30 cm and is characterized in that the shape is small and the data memorizing capacity is large. Therefore, the optical disc driving apparatus recording/reproducing data in this optical disc is used as an auxiliary memorizing apparatus in such computer system as, for example, an image filing system.

In the case of recording data in this optical disc, if the optical disc is divided, for example, into sector units and a physical position (called a physical address hereinafter) is designated to each sector, writing will be made to the physical address of the usually used sector and, in order to judge whether this writing is accurately made or not, just after this writing, there will be made a collating operation of reading and collating the physical address and data. The timing of the writing and reading is that the writing will be made when the above mentioned sector is positioned in an optical head writing data into the above mentioned optical disc and the reading will be made when the above mentioned sector is positioned in an optical head reading data out of the above mentioned optical disc. That is to say, in case the writing optical head and reading optical head are the same, when the optical disc makes one rotation, a collating operation will be made. Also, the physical address is usually a combination of a track which is a peripheral position of the above mentioned optical disc and a sector number given to each of the sectors dividing the track number given to this track into a predetermined number.

In the above described collating operation, a writing error may be generated in case the written data can not be detected or in case an error exceeding the range which can be corrected is generated even though it is intended to correct errors of the read data. Also, in case the above described writing is to be carried out, a writing error which cannot detect the physical address of the usually used sector may be generated.

Therefore, the physical address of the sector which is an alternate of the physical address of the usually used sector is determined and an alternating process for writing into this alternating sector the contents of the sector in which a writing error has been generated is carried out. This alternating sector may be a sector near the usually used sector or may be a separately determined sector separated from the usually used sector.

In case the above described alternating process is made, data mentioning the contrast of the physical address of the usually used sector and the physical address of the alternating sector will be recorded in a predetermined physical address of the above mentioned optical disc.

For example, SDL (Secondary Defect List) formats mentioning the physical addresses in the above mentioned optical disc recording data mentioning the contrast of the physical address of the usually used sector and the physical address of the alternating sector are regulated in 14, 4, 3 and 3 of ISO/IEC JTC1/SC23N292 of ISO (International Standardization Organization). According to this, the above mentioned SDL is regulated to be provided in four places in an optical disc system controlling area.

It is suggested in the publication, for example, of Japanese Patent Application Laid Open No. 205741/1985 that, in case the above described alternating process is made, data mentioning the contrast of the physical address of the usually used sector and the physical address of the alternating sector will be recorded in the above mentioned optical disc.

In case the above described alternating process is generated, the above mentioned SDL will be renewed.

SUMMARY OF THE INVENTION

An object of the present invention is to provide an optical recording/reproducing apparatus wherein, even in case a DDS cannot be detected, it will be judged again whether an optical recording medium has not been used and, in case it is judged that the optical recording medium has not been used, the optical recording medium will be operated to be initialized, characterized in that data already recorded in the optical recording medium can be prevented from being read according to a wrong judgment.

An object of the present invention is to provide an optical recording/reproducing apparatus wherein, even in case the SDL fails to be renewed, the SDL before it will not become unable to be read out.

Briefly, the present invention comprises:

an optical head provided with a light beam generating means generating a condensable light beam, an optical system radiating the above mentioned optical beam to an optical recording medium and a light detector receiving a returning light from the above mentioned optical recording medium;

a signal outputting means for outputting a recording signal corresponding to the recorded information to be recorded in the above mentioned light beam generating means and a controlling signal corresponding to the controlling information controlling the above mentioned recorded information;

a reproduced information producing means for producing reproduced information corresponding to the information recorded in the above mentioned recording medium from the reproducing signal output from the above mentioned light detector;

a first judging means wherein, when it is collated by a collating means whether reproduced information obtained by using the above mentioned reproduced information producing means the information temporarily recorded in the target recording area of the above mentioned optical recording medium coincides with the information before the recording within an error correcting capacity or not, in case the above mentioned reproduced information does not coincide with the information before the recording within the error correcting capacity, it will be judged whether the above mentioned target recording area is a defective recording area or a non-defective recording area;

an alternating processing means wherein, in case the above mentioned target recording area is judged by the above mentioned first judging means to be a defective recording area, controlling information controlling the correspondence of the alternate recording area alternating the above mentioned target recording area and the above mentioned target recording area will be renewed, the renewed controlling information will be memorized by an information memorizing means, the information recorded in the above mentioned target recording area will be temporarily recorded in the above mentioned alternating recording area and the controlling information recorded in the controlling information recording area of the above mentioned optical recording medium will be renewed;

a controlling information detecting means for detecting the above mentioned controlling information recorded in the above mentioned controlling information recording area renewed by the above mentioned alternating processing means by using the above mentioned reproduced information producing means;

a second judging means wherein, in case the above mentioned controlling information is not detected by the above mentioned controlling information detecting means, it will be judged by using the above mentioned collating means whether the above mentioned reproduced information producing means is normal or not and it will be judged whether the above mentioned reproduced information producing means is abnormal or the above mentioned optical recording medium is abnormal; and an initializing means wherein, in case the above mentioned optical recording medium is judged by the above mentioned second judging means to be abnormal, the above mentioned controlling information recording area of the above mentioned optical recording medium will be initialized.

These and other objects and advantages of the present invention will become more apparent from the following detailed explanations.

BRIEF DESCRIPTION OF THE DRAWINGS

FIGS. 1 to 11 relate to the first embodiment of the present invention.

FIG. 1 is a formation diagram of a small disc driving apparatus.

FIG. 2 is a block diagram showing a concrete formation of an address discriminating/error detecting circuit.

FIG. 3 is a block diagram of a small disc driving apparatus.

FIG. 4 is an explanatory view of an optical disc.

FIG. 5 is an explanatory view of an optical disc recording type.

FIG. 6 is an explanatory view of SDL data.

FIG. 7 is an explanatory view of an optical disc recording type.

FIGS. 8 to 11 are flow charts relating to the control of an optical disc driving apparatus.

DETAILED DESCRIPTION OF THE PREFERRED EMBODIMENTS

Figure 3:
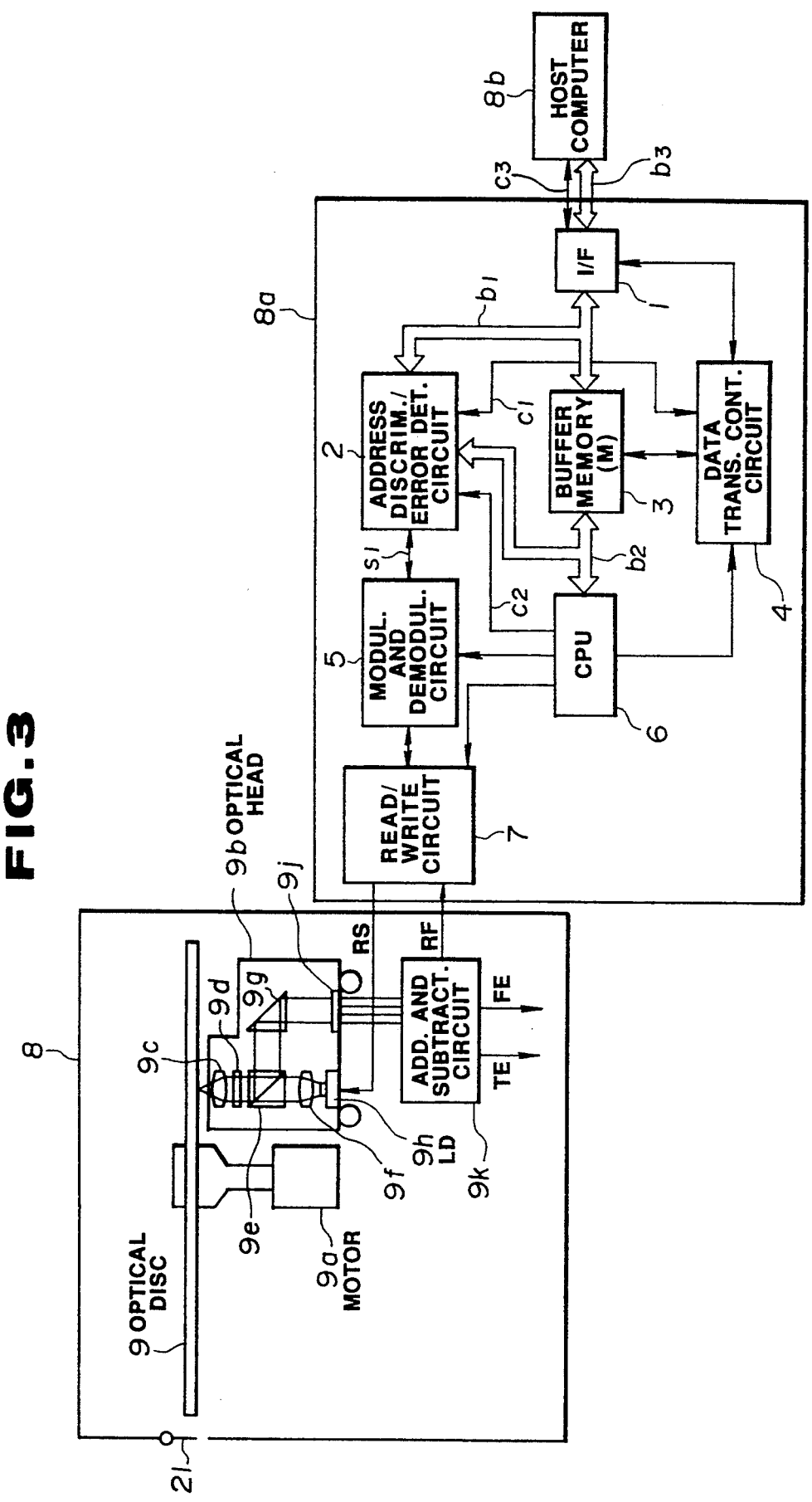

As shown by the reference numeral 20, for example, in FIG. 1, an optical disc driving apparatus comprises an inserting port 21 through which a recording medium 22 which is, for example, an optical disc is inserted and discharged, a recording and reproducing means 24 for recording/reproducing data in the above mentioned recording medium, a collating means 25 for reproducing and collating the data recorded by this recording and reproducing means 24, an alternating processing means 26 for alternating processing in case the collated results of the above mentioned collating means 25 do not coincide, a memory controlling means 27 for memorizing in a later described memorizing means data of an SDL 23 recorded in the above mentioned recording medium 22 when the above mentioned recording medium 22 is inserted through the above mentioned inserting port 21 and when a later described power source 22 is put in in case the above mentioned recording medium 22 is inserted, a memorizing means 28 for memorizing a physical address (called an address hereinafter) in the above mentioned memorizing medium of the above mentioned SDL 23 and the like, a bus line b transmitting respectively the signals of a later described interface (called an I/F hereinafter) 1 and later described microprocessor (called a CPU) 6, a CPU 6 operating and controlling signals from the above mentioned recording/reproducing means 24, collating means 25, alternating processing means 26, memorizing controlling means 27 and a later described I/F 1, an I/F 1 connecting the signal of the above mentioned bus line b and an upper computer system, for example, not illustrated and inputting and outputting signals, a bus line b3 transmitting signals of the above mentioned I/F and above described computer system not illustrated and a power source 29 feeding power to the respective blocks of the above mentioned optical disc driving apparatus.

The above mentioned recording/reproducing means 24, collating means 25, alternating processing means 26, memorizing controlling means 27, I/F 1 and CPU 6 are connected through the bus line b.

As shown, for example, in FIG. 3, the optical disc driving apparatus 20 comprises an optical disc recording/reproducing unit 8 and a disc controlling apparatus 8a which is connected with a host computer 8b by a bus line b3 and signal line c3 through the above mentioned I/F 1 so as to transmit data.

The above mentioned optical disc recording/reproducing unit 8 is rotated and driven by a spindle motor 9a. An optical head 9b is arranged as opposed to one surface of the optical disc 9 which is the above mentioned recording medium 22 and is movable in the radial direction of the optical disc 9 by such head feeding mechanism as a voice coil motor not illustrated so as to be able to have access to any track of the optical disc 9.

In the above mentioned optical head 9b, a light beam of a laser diode 9h generating a condensable light beam is made a parallel light by a collimating lens 9f, then enters a polarizing beam splitter 9e by P-polarization, passes through this polarizing beam splitter 9e substantially by 100% and is made a circular polarized light beam by a ¼-wavelength plate 9d. This circular polarized light beam is condensed by an objective lens 9c and is radiated to the above mentioned optical disc 9.

The light reflected by this optical disc 9 becomes an S-polarized light through the above mentioned objective lens 9c and ¼-wavelength plate, is reflected substantially by 100% by the above mentioned polarizing beam splitter 9e and enters a critical angle prism 9g. (By the way, in fact, the critical angle prism 9g is arranged in the direction vertical to the paper surface in FIG. 3.) The light reflected by this critical angle prism 9g is received, for example, by a four-divided light detector 9j, is photoelectrically converted and is input into an adding and subtracting circuit 9k to produce a reproduced signal RF, focussing signal FE and track error signal TE.

The above mentioned disc controlling apparatus 8a comprises an address discriminating/error detecting circuit 2 detecting the later described ID part of the optical disc 9 and correcting errors at the time of reading, a buffer memory (M) 3 temporarily memorizing data, a data transfer controlling circuit (M) 4 controlling the transfer of data, a modulating/demodulating circuit 5 modulating written data and demodulating read data, a CPU 6 operating the respective blocks within this apparatus by predetermined procedures and a READ/WRITE circuit 7 controlling the radiation of the above mentioned laser diode 9h and processing the signal such as shaping the waveform of the reproduced signal RF.

The above mentioned reproduced signal RF is input into the above mentioned modulating/demodulating circuit 5 through the above mentioned READ/WRITE circuit 7 and is demodulated. In the recording mode, this modulating/demodulating circuit 5 modulates data from the host computer 8b and then outputs them as a recording signal RS to the optical disc recording/reproducing unit 8 through the above mentioned READ/WRITE circuit 7.

The above collating means 25 comprises the above mentioned address discriminating/error detecting circuit 2. The above mentioned recording/reproducing means 24 comprises the above mentioned modulating/demodulating circuit 5, READ/WRITE circuit 7 and optical disc recording/reproducing unit 8. The above mentioned DDS detecting means 25 comprises the CPU 6.

The above mentioned memorizing means 28 comprises the above mentioned buffer memory (M) 3.

As shown in FIG. 2, the above mentioned address discriminating/error detecting circuit 2 comprises an S-P converter 10 converting a serial signal demodulated by the modulating/demodulating circuit 5 to a parallel signal, an ID comparing circuit 11 detecting the data of the ID part of the above mentioned optical disc 9 in this parallel signal and comparing them with a predetermined ID, a data transfer controlling circuit (S) 12 controlling the transfer of data, an ECC/CRC/Syndrome comparing calculator comparing or calculating the ECC, CRC and syndrome of the above mentioned optical disc 9, a buffer memory (S) 14 temporarily memorizing data input into and output from the S-P converter 10, a syndrome buffer 15 temporarily memorizing the above mentioned syndrome and an error correcting-/counting circuit 16 correcting data of the above mentioned buffer memory (S) 14 and counting the corrected number.

The above mentioned S-P converter 10 is connected with the above mentioned modulating/demodulating circuit 5 by a signal line s1.

The above mentioned buffer memory (S) 14 is connected to the above mentioned I/F 1 and buffer memory (M) 3 by a bus line b1 and to the above mentioned data transfer controlling circuit (M) 4 by a signal line c1.

The above mentioned error correcting/counting circuit 16 is connected to the above mentioned CPU 6 and buffer memory (M) 3 by a bus line b2 and to the above mentioned CPU 6 by a signal line c2.

Figure 4:
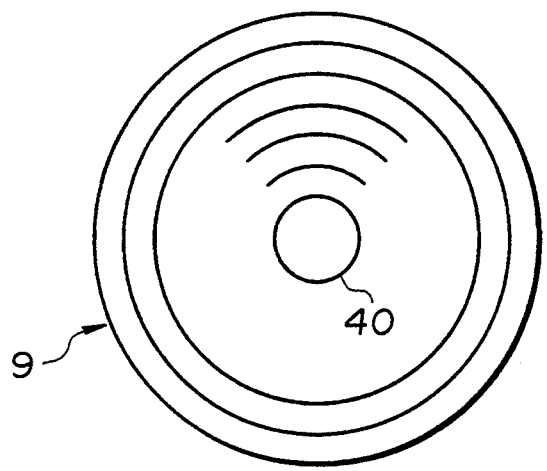

As shown in FIG. 4, the above mentioned optical disc 9 is divided into a plurality, for example, of concentric circular tracks 40.

Figure 5:
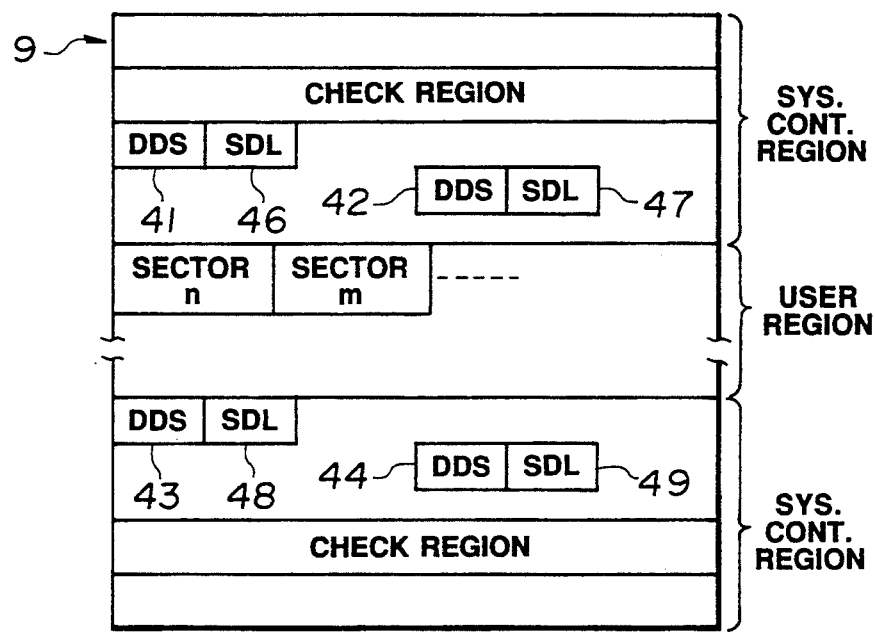

As shown in FIG. 5, the above described plurality of tracks 40 are divided into a system controlling region and user region as defined, for example, by ISO. The above mentioned system controlling region is provided with a checking region judging whether the above mentioned optical disc 9 is normal or not, DDS's (Disc Definition Structures) 41 to 44 recording such controlling information as a defective region of the optical disc and SDL's (Secondary Defect Lists) 46 to 49 recording the data of a defective region defined in 14, 4, 3, 3 of ISO/IEC JTC1/SC23N292 and an alternating region corresponding to this defective region.

Figure 6:
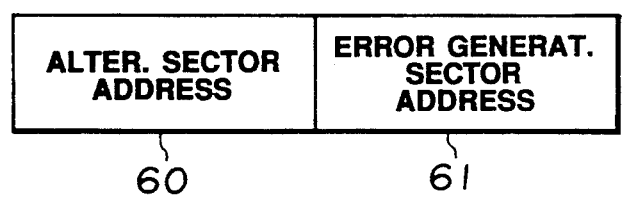

The above mentioned SDL's 46 to 49 are shown, for example, in FIG. 6 in which are recorded the data of an alternated sector address 60 which is a later described alternated physical address and an error generating sector address 61 which is a physical address of a defective sector. Also, the addresses and data of these SDL's 46 to 49 are to be memorized in the same manner in the memorizing means shown in FIG. 1.

Figure 7:
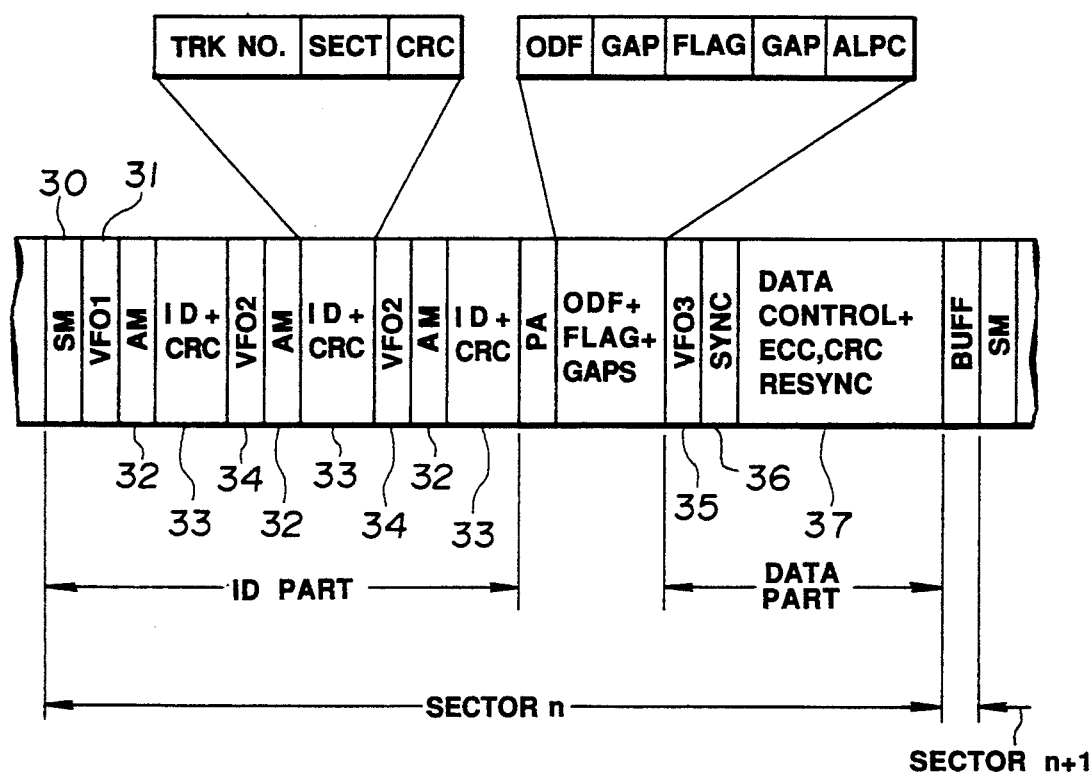

Further, as shown, for example, in FIG. 7, a sector which is a recording unit of the above mentioned disc 9 is formed of an ID part comprising a region 30 of a sector mark (SM), a region 31 of a synchronizing signal (VFO1), a region 32 of an address mark (AM), a region 33 of a physical address (ID+CRC) of the optical disc 9 and a region 34 of a synchronizing signal (VFO2) and a data part comprising a region 35 of a synchronizing signal (VFO3), a region 36 of a synchronizing signal (SYNC) and a region 37 in which data are recorded.

The data written into the optical disc 9 and shown in FIG. 7 are read out by the optical head 8 shown in FIG. 3, are demodulated by the modulating/demodulating circuit 5 through the READ/WRITE circuit 7 and are input into the S-P converter 10 by the signal line s1 shown in FIG. 2. Also, in case the data are written into the above mentioned optical disc 9, whether the writing is correct will be read out and collated in the same manner.

The signals input into this S-P converter 10 are serially (in series) arranged data, have the address mark (AM) of the region 32 shown in FIG. 7 detected by the S-P converter 10, are converted to parallelly (in parallel) arranged data making, for example, 8 bits 1 byte since the bit just after this detection and are input into the ID comparing circuit 11 and data transferring circuit (S) 12 through a bus line.

The above mentioned ID comparing circuit 11 reads out the region 33 of the ID part shown in FIG. 7 of the above mentioned data to obtain an address formed of the track number TRK NO. and sector number SECT of the optical disc 9 in which the data are written.

Further, in the above mentioned ID comparing circuit 11, the address to be read out set in advance and the above described address are compared with each other and, in case they coincide with each other, coinciding information will be output to the above mentioned data transferring circuit (S) 12.

Thereby, the above mentioned data transferring circuit (S) 12 stores the above mentioned data in the buffer memory (S) 14 through a bus line.

The above mentioned ECC/CRC/Syndrome comparing calculator 13 obtains ECC and CRC signals from the region 37 of the data part shown in FIG. 7 and calculates the later described CRC and syndrome from the data signal of the region 37 of the above mentioned data part. The above described CRC is an error detecting sign of the above mentioned data and the syndrome is of a value determined by the above mentioned data and the error produced in the data. Further, in the ECC/CRC/syndrome comparing calculator 13, the above described syndrome is stored in the syndrome buffer 15 shown in FIG. 2 through the above described syndrome bus line and the CRC obtained from the above mentioned region 37 and the CRC obtained by the above mentioned calculation are compared with each other and, in case they do not coincide with each other, non-coinciding information will be output to the error correcting/counting circuit 16.

Further, after all the syndrome is calculated, in the above mentioned error correcting/counting circuit 16, by using the syndrome stored in the syndrome buffer 15 as described above, the above mentioned data stored in the above mentioned buffer memory (S) 14 are corrected and the number of the corrected bytes, that is, the number of the erroneous bytes is counted and is output to the CPU 6 shown in FIG. 3 through the bus line b2. The data corrected as described above are stored in the buffer memory (M) 3 through the bus line b1 shown in FIG. 3.

In the above mentioned buffer memory (M) 3, the above mentioned data are accumulated by a plurality of addresses (or a plurality of sectors) and are output to the host computer 8b through the I/F.

The operation of the thus formed optical disc driving apparatus shall be explained.

As shown in FIG. 1, the CPU 6 controls and processes through the bus line b the recording/reproducing means 24, collating means 25, processing means 26, memory controlling means 27, memorizing means 28 and I/F 1.

In case the recording medium 22 is inserted through the inserting port 21 or in case the power source 29 is put in while the above mentioned recording medium 22 is inserted, the above mentioned CPU will carry out the process from the step (mentioned as S hereinafter) 150 shown in FIG. 8.

Figure 8:
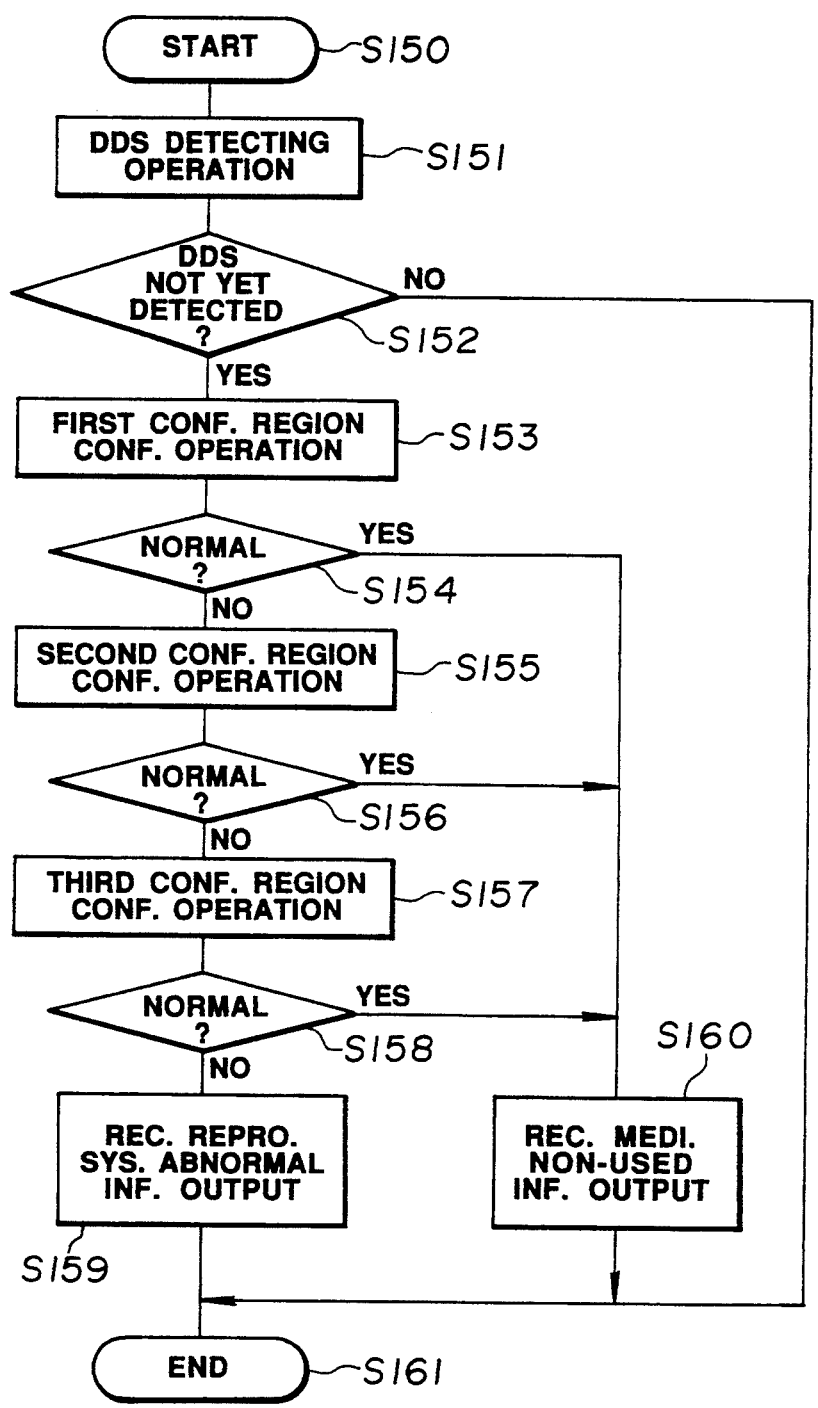

First of all, this process shall be explained on the basis of the flow chart shown in FIG. 8.

In the control started by S150, a DDS reading operation is carried out by S151. This DDS reading is made by the above mentioned recording/reproducing means 24 on the respective DDS's 41 to 44 shown in FIG. 5. First of all, the ID part of the sector shown in FIG. 7 is detected. In case this ID part can be detected, the data part will be read in and whether this data part is normally read in or not will be detected. The information of whether the above described ID can be detected or not, the information of whether the data part is normally read in or not and the data of the normally read data part are memorized in the memorizing means 28 shown, for example, in FIG. 1 and the process is continued to S152 shown in FIG. 8.

In the above mentioned S152, it is judged whether at least one of the above mentioned DDS's 41 to 44 is normally read in or not, that is, whether the DDS can be detected or not. By this judgment, in case the above mentioned DDS can not be detected, that is, is not yet detected (YES), the process will be continued to S153 but, in case the DDS is detected (NO), the process will be continued to S161 and will be continued to S220 shown in FIG. 10 through this S161.

Returning to FIG. 8, in the above mentioned S153 is made an operation to confirm whether the above mentioned recording/reproducing means 24 normally operates or not. In this confirming operation, random data memorized, for example, in the buffer memory or predetermined pseudo data are written into the confirming region determined in the checking region of the system controlling region shown in FIG. 5 and the written data are collated by the above mentioned collating means 25. Thereafter, the process is continued to S154.

In the above mentioned S154, it is judged whether the collation result in the above mentioned S153 by the above mentioned collating means 25 is normal or not. In case the result is not normal (NO), the process will be continued to S155. In case it is normal (YES), that is, in case the above mentioned recording/reproducing means 24 is normally operating, the process will be continued to S160.

In the above mentioned S155, the same operation as in the above mentioned S153 is made and the process is continued to S156. In the above mentioned S156, the same judgment as in the above mentioned S155 is made. In case the operation is not normal (NO), the process will be continued to S157. In the above mentioned S157, the same operation as in the above mentioned S153 is made and the process is continued to S158. In the above mentioned S158, the same judgment as in the above mentioned S155 is made. In case the operation is not normal (NO), the process will be continued to S159.

In the above mentioned S159, as the process of the normal writing/collating operation has not been carried out in three confirming regions by the above mentioned S153, S155 and S157, such recording/reproducing system as the above mentioned recording/reproducing means 24 is considered to be abnormal, the abnormal state is output to the host computer 8b through the above mentioned I/F 1 shown, for example, in FIG. 1 and the process is continued to S161 shown in FIG. 8. By this S161, all the process ends.

Also, in the above mentioned S160, as the process of the normal writing/collating operation has been carried out in three confirming regions by the above mentioned S153, S165 and S167, the recording medium 22 is not yet used and is not initialized and the process is continued to S161. The process is continued to S200 shown in FIG. 9 through this S 161.

In the the explanation of the subsequent process, for example, in FIG. 5, the SDL 46 is made a first SDL region, SDL 47 is made a second SDL region, SDL 48 is made a third SDL region and SDL 49 is made a fourth SDL region.

Figure 9:
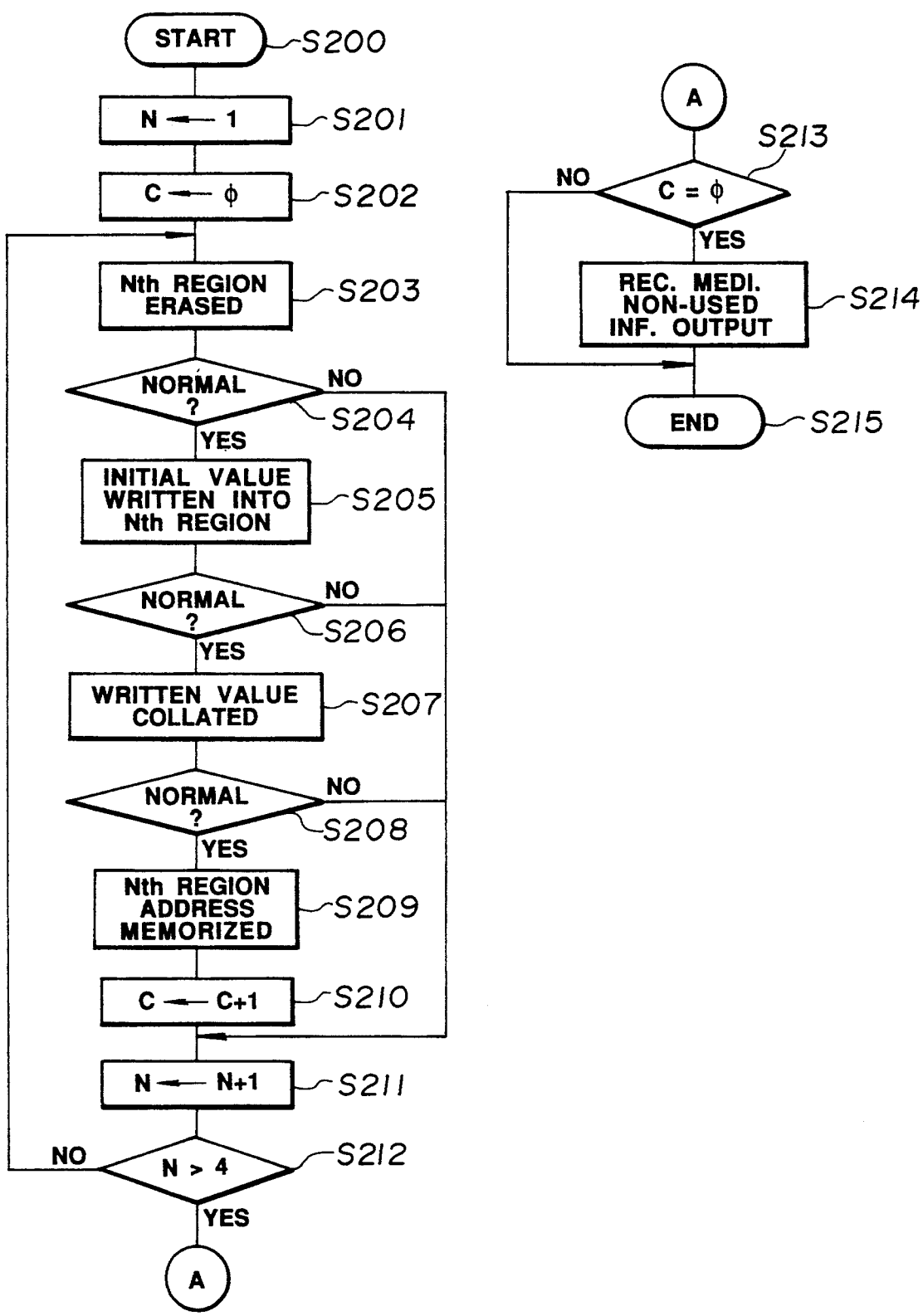

The initializing process is started from S200 as shown in FIG. 9.

In the initializing process started from the above mentioned S200, in S201, 1 is set in the value of N designating the serial number of the SDL and the process is continued to S202 and, in S202, zero is set in the counter value C which is a number of times of making a normal initializing process and the process is continued to S203.

In the above mentioned S203, the SDL region of the value of N is erased and the process is continued to S204 together with the information of whether this erasing process is normally made or not.

In the above mentioned S204, it is judged whether the erasing process in the above mentioned S203 is normally made or not. In case it is made normally (YES), the process will be continued to S205. In case a physical address can not be detected in the erasing process of the above mentioned S203 and the process is not normally made (NO), the process will be continued to a later described S211.

In the above mentioned S205, initial value data are written into the SDL region of the value of N and the process is continued to S206 together with the information of whether this writing process is normally made or not.

In the above mentioned S206, it is judged whether the writing process in the above mentioned S205 is normally made or not. In case it is normally made (YES), the process will be continued to S207. In case a physical address can not be detected in the writing process of the above mentioned S205 and the process is not normally made (NO), the process will be continued to a later described S211.

In the above mentioned S207, the initial value data written in the above mentioned S205 are collated and the process is continued to S208 together with the information of whether the initial value data are normally written in or not.

In the above mentioned S208, it is judged whether the initial value data are normally written in or not. In case they are normally written in (YES), the process will be continued to S209. In case the read data exceed the error correcting range in the collating process of the above mentioned S207 and the process is not made normally (NO), the process will be continued to a later described S211.

In the above mentioned S209, the physical address of the region of the SDL of the value of N is memorized by the above mentioned memorizing means 28 shown in FIG. 1 and the process is continued to S210.

In the above mentioned S210, 1 is added to the above mentioned counter value C and the process is continued to S211.

In the above mentioned S211, 1 is added to the value of the above mentioned N and the process is continued to S212.

In the above mentioned S212, it is judged whether the value of the above mentioned N exceeds 4 or not, that is, whether the initializing process has ended until the fourth SDL or not. In case it has not ended (NO), the process from the above mentioned S203 will be repeated. In case it has ended (YES), the process will be continued to S213.

In the above mentioned S213, it is judged whether the above mentioned counter value C is zero or not. In case it is zero, that is, in case the initializatioin of the above mentioned SDL 23 has not succeeded (YES), the process will be continued to S214. In case it is not zero, that is, in case the initialization of at least one SDL has succeeded, the process will be continued to S215. By S215, all the process ends.

In the above mentioned S214, the recording medium 22 is considered to be abnormal, this abnormal state is output to the host computer 8b through the above mentioned I/F 1 shown, for example, in FIG. 1 and the process is continued to S215 shown in FIG. 9. By this S215, all the process ends.

Figure 10:
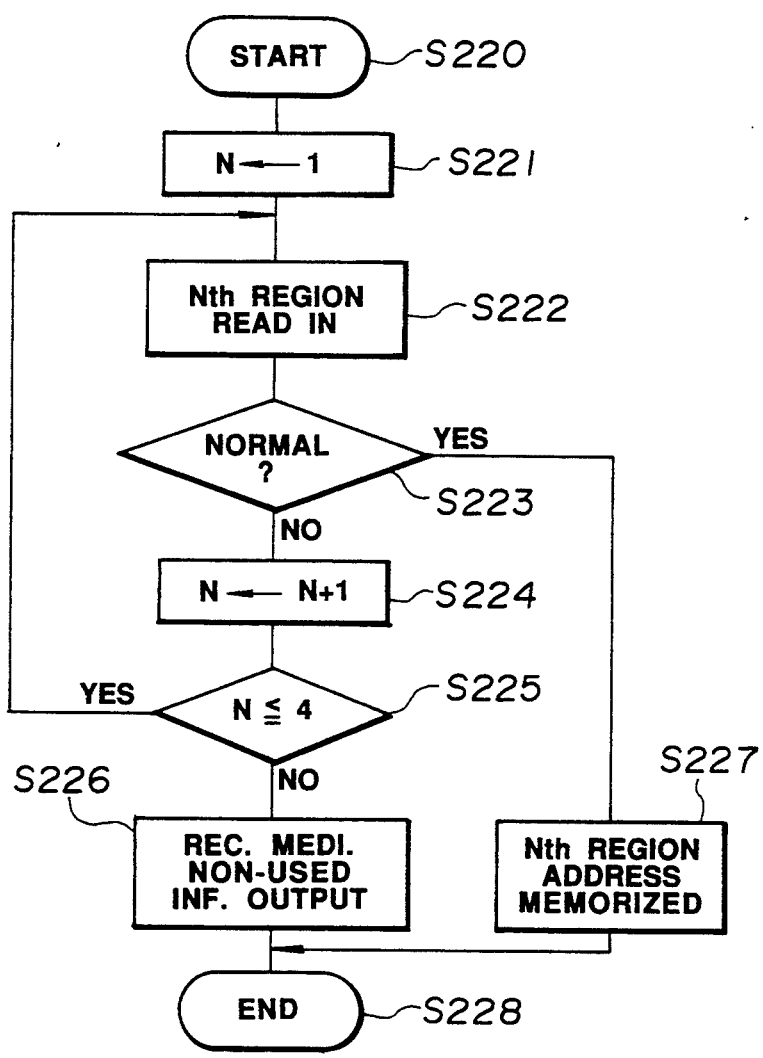

There shall be explained the process shown in FIG. 10 and continued from S161 shown in FIG. 8 in case the recording medium 22 is inserted through the inserting port 21 as described above or in case the power source 29 is put in while the above mentioned recording medium 22 is inserted.

In the process started from the above mentioned S220, 1 is set in the value of N which is a serial number of the SDL in S221. The process is continued to S222.

In the above mentioned S222, SDL data are read in from the SDL region of the value of N and the process is continued to S223 together with the information of whether this reading process has been normally made or not.

In the above mentioned S223, it is judged whether the collating process in the above mentioned S222 is normally made or not. In case it is normally made (YES), the process will be continued to a later described S227. In case the data read out in the reading process of the above mentioned S222 exceed the error correcting range and the process is not normally made (NO), the process will be continued to S224.

In the above mentioned S225, it is judged whether the value of the above mentioned N is below 4 or not. In case it is below 4 when the process of reading in all SDL's has not ended (YES), the process from S222 will be repeated. In case the process of reading in all SDL's has all failed, that is, in case the value of N exceeds 4 (NO), the process will be continued to S226.

In the above mentioned S224, 1 is added to the value of the above mentioned N and the process is continued to S225.

In the above mentioned S226, the recording medium 22 is considered to be abnormal, this abnormal state is output to the host computer 8b through the above mentioned I/F 1 shown, for example, in FIG. 1 and the process is continued to S228 shown in FIG. 10. By this S228, all the process ends.

In the above mentioned S227, the physical address of the region of the SDL of the value of N is memorized by the above mentioned memorizing means 28 shown in FIG. 1 and the process is continued to S228 shown in FIG. 10. By S228, the process ends.

Figure 11:
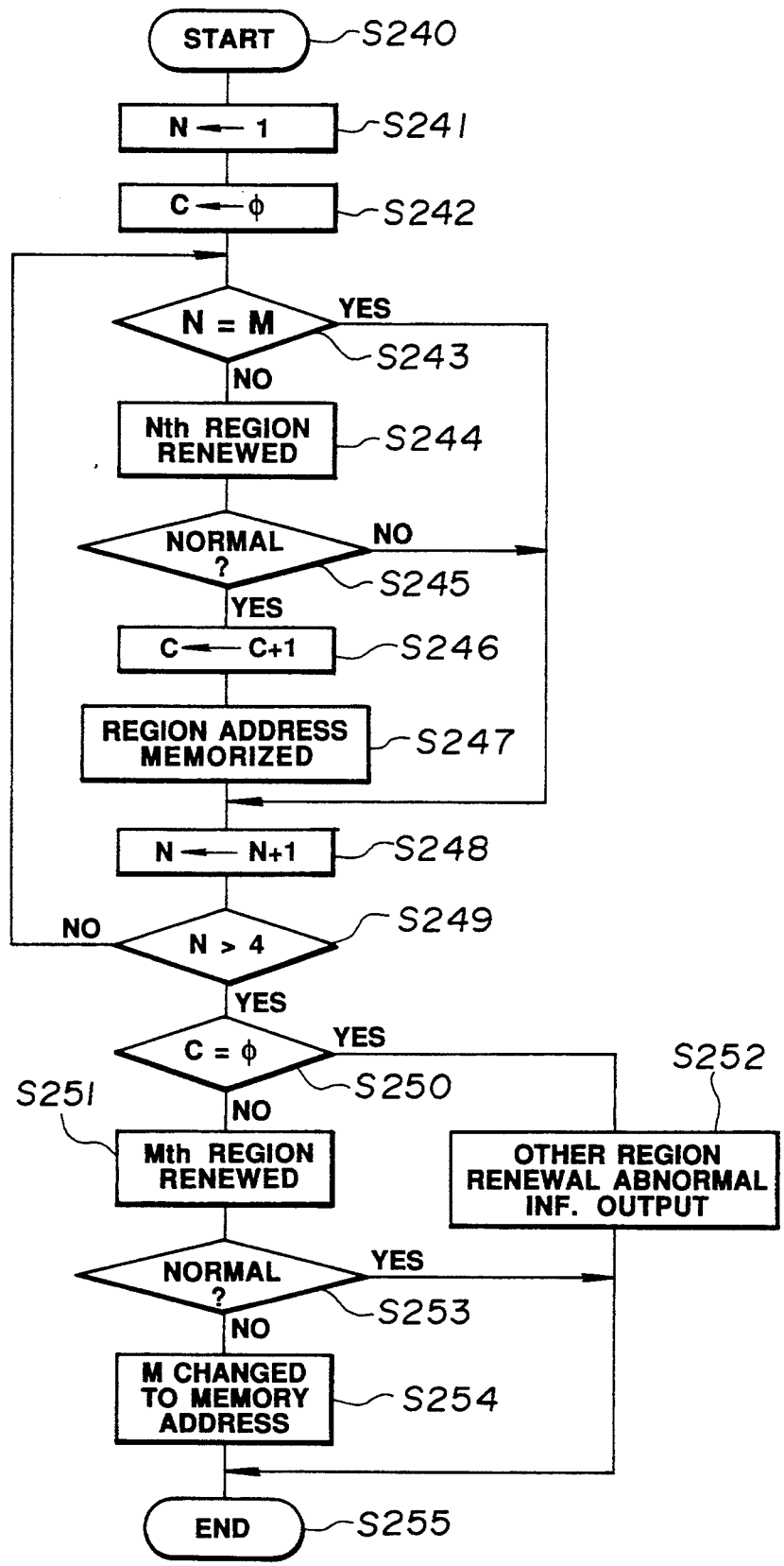

Here, in case the SDL is to be renewed, the process from S240 shown in FIG. 11 will be started.

In the process started from the above mentioned S240, in S241, 1 is set in the value of N designating the serial number of the SDL and the process is continued to S242. In S242, zero is set in the counter value C which is a number of times of normally making the renewing process and the process is continued to S243.

In the above mentioned S243, the value of N and M which is the serial number of the SDL normally read in as described above are compared with each other. In case they coincide with each other (YES), the process will be continued to a later described S248. In case they do not coincide with each other (NO), the process will be continued to S244.

In the above mentioned S244, the SDL data of the SDL region of the value of N are renewed and the process is continued to S245 together with the information of whether this renewing process is normally made or not.

In the above mentioned S245, it is judged whether the renewing process in the above mentioned S244 is normally made or not. In case it is normally made (YES), the process will be continued to S246. In case the data read out in the renewing process of the above mentioned S244 exceed the error correcting range and the process is not normally made (NO), the process will be continued to a later described S248.

In the above mentioned S246, 1 is added to the above mentioned counter value C and the process is continued to S247.

In the above mentioned S247, the SDL address of the region in which the renewing process has succeeded in the above mentioned S244 is memorized in the memorizing means 28 shown, for example, in FIG. 1.

Returning to FIG. 11, in the above mentioned S247, when the above described process ends, the process will be continued to S248.

In the above mentioned S248, 1 is added to the value of the above mentioned N and the process is continued to S249.

In the above mentioned S249, it is judged whether the value of the above mentioned N exceeds 4 or not. In case it does not exceed 4, that is, in case the other SDL's than the above mentioned M are not renewed at all (NO), the process from the above mentioned S243 will be repeated but, in case it exceeds 4, that is, in case the other SDL's than the above mentioned M are renewed (YES), the process will be continued to S250.

In the above mentioned S250, it is judged whether the value C of the above mentioned counter is zero or not. In case this counter value C is zero, that is, in case the renewing process for the SDL's of the other regions than the above mentioned M for which the last renewing process has succeeded has failed (YES), the process will be continued to a later described S252. In case the above mentioned counter value C is above 1, that is, in case the renewing process for the SDL of at least one of the other regions than the above mentioned M for which the last renewing process has succeeded has succeeded (NO), the process will be continued to S251.

In the above mentioned S251, the data of the SDL of the region of the above mentioned M are renewed and the process is continued to S253 together with the information of whether this renewing process has been normally made or not. In the above mentioned S253, it is judged whether the renewing process in the above mentioned S251 has been normally made or not. In case the data read out in the renewing process of the above mentioned S251 exceed the error correcting range and the renewing process is not normally made (NO), the process will be continued to a later described S254. In case it is normally made (YES), the process will be continued to S255. By this S255, all the renewing process for the SDL ends.

In the above mentioned S254, as the SDL data of the region of the above mentioned M have not been able to be renewed, the value of the above mentioned M is converted to the value memorized in the above mentioned S247 and the process is continued to S255. By this S255, all the renewing process for the SDL ends.

In the above mentioned S252, as the SDL data of the other regions than M for which the last renewal has succeeded have not been able to be renewed, the above mentioned recording medium 22 is considered to be abnormal and this abnormal state is output to the host computer 8b through the above mentioned I/F 1 shown, for example, in FIG. 1. By S255 shown in FIG. 11, all the process ends.

That is to say, there is an effect that, in case the SDL data of the regions other than the region for which the last renewal has succeeded have not been able to be renewed, the SDL data for which the last renewal has succeeded will not be renewed but the SDL data one generation before will be able to be kept.

Figure 12:
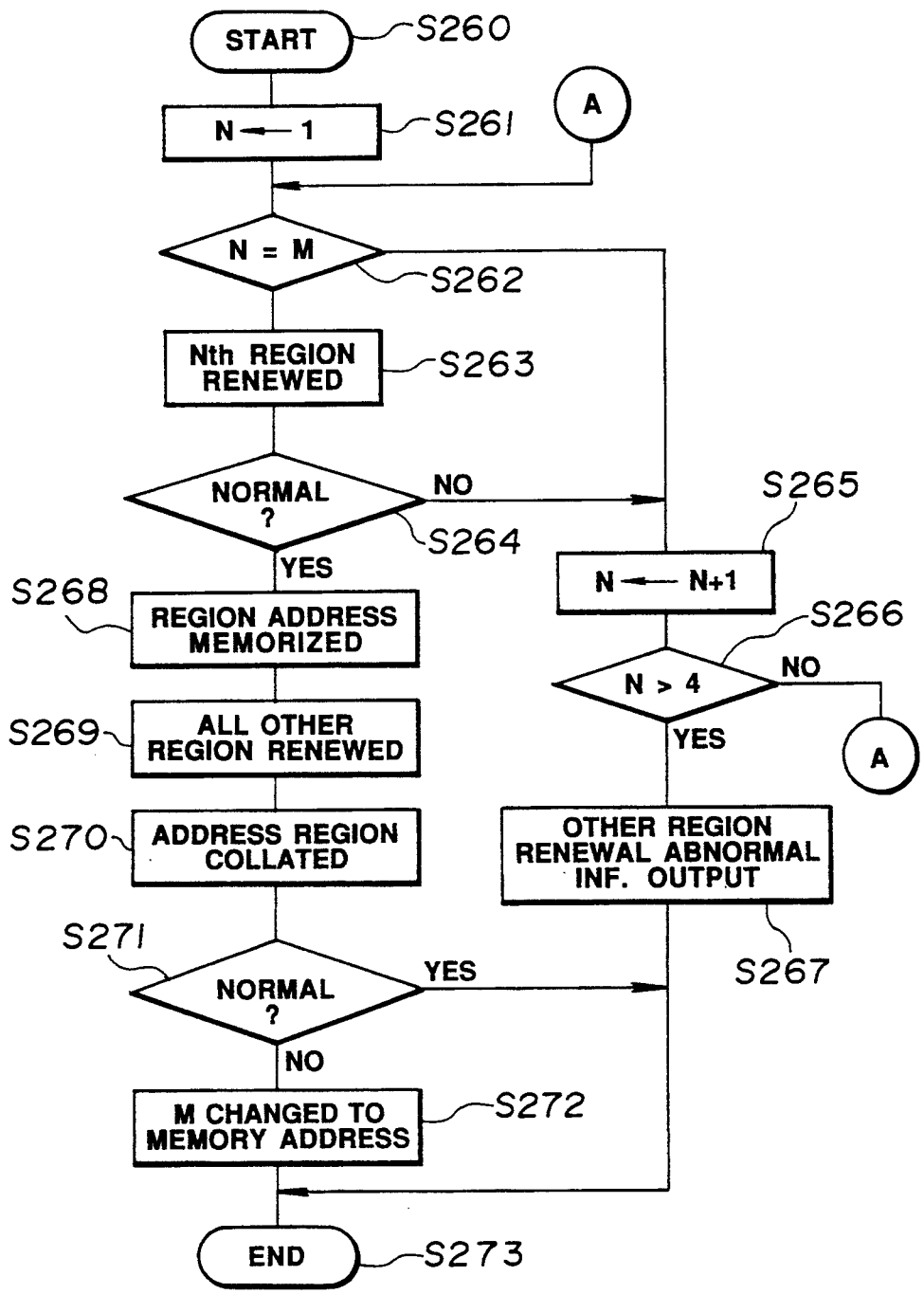
FIG. 12 relates to the second embodiment of the present invention and is a flow chart relating to the control of an optical disc driving apparatus.

In the second embodiment, the same as in the first embodiment, in case the SDL is to be renewed, the process from S260 shown in FIG. 12 will be started.

By the process started from the above mentioned S260, 1 is set in the value of N designating the serial number of the SDL in S261 and the process is continued to S262.

In the above mentioned S262, the value of N and M which is the serial number of the normally read SDL as described above are compared with each other. In case they coincide with each other (YES), the process will be continued to a later described S265. In case they do not coincide (NO), the process will be continued to S263.

In the above mentioned S263, the SDL data of the SDL region of the value of N are renewed and the process is continued to S264 together with the information of whether this renewing process is normally made or not.

In the above mentioned S264, it is judged whether the renewing process in the above mentioned S263 is normally made or not. In case the data read out in the renewing process of the above mentioned S263 exceed the error correcting range and the process is not normally made (NO), the process will be continued to S265. In case it is normally made (YES), the process will be continued to a later described S268.

In the above mentioned S265, 1 is added to the value of the above mentioned N and the process is continued to S266.

In the above mentioned S266, it is judged whether the value of the above mentioned N exceeds 4 or not. In case it does not exceed 4, that is, all the other SDL's than the above mentioned M are not renewed (NO), the process from the above mentioned S262 will be repeated. In case it exceeds 4, that is, the other SDL's than the above mentioned M are renewed (YES), the process will be continued to S267.

In the above mentioned S267, as the SDL data of the other regions than M which has succeeded in the last renewal have not been able to be renewed, the above mentioned recording medium 22 is considered to be abnormal and this abnormal state is output to the host computer 8b through the above mentioned I/F 1 shown, for example, in FIG. 1. By S273 shown in FIG. 12, all the process ends.

In the above mentioned S268, the SDL address of the region for which the renewing process has succeeded in the above mentioned S268 is memorized in the memorizing means 28 shown, for example, in FIG. 1.

Returning to FIG. 12, in the above mentioned S268, when the above described process ends, the process will be continued to S269.

In the above mentioned S269, the SDL data of the other regions than the regions for which the renewing process has succeeded in S263 including the above mentioned M are all renewed and the process is continued to S270.

In the above mentioned S270, the data of the SDL of the region of the above mentioned M are collated and the process is continued to S271 together with the information of whether this collating process is normally made or not. In the above mentioned S271, it is judged whether the collating process in the above mentioned S270 is normally made or not. In case the data read out in the collating process in the above mentioned S270 exceed the error correcting range and the collating process is not normally made (NO), the process will be continued to a later described S272. In case it is normally made (YES), the process will be continued to S273. By this S273, the SDL renewing process all ends.

In the above mentioned S272, as the SDL data of the region of the above mentioned M have not been able to be renewed, the value of the above mentioned M is changed to the value memorized in the above mentioned S268 and the process is continued to S273. By this S273, the SDL renewing process all ends.

That is to say, in case one of the other SDL regions than the SDL region which has succeeded in the last renewal has been able to be renewed, the other SDL regions will be renewed en bloc and therefore there will be an effect that the process will be simple.

The other formations, operations and effects are the same as in the above described embodiment.

Figure 13:
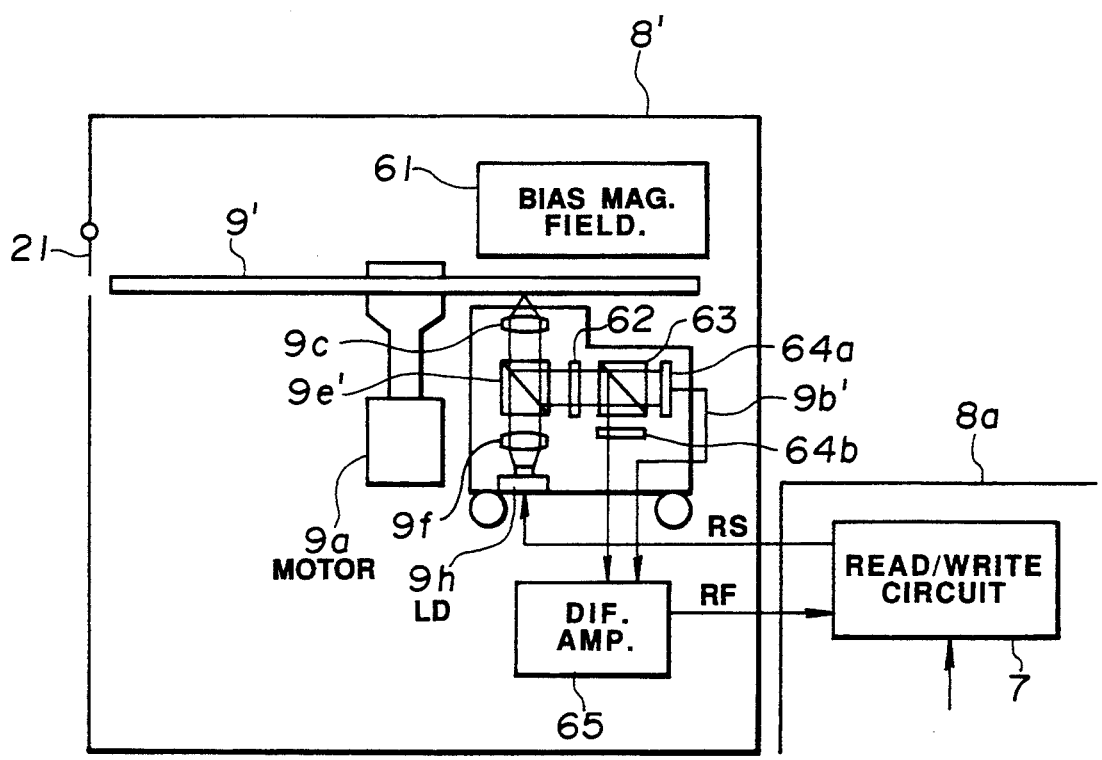
FIG. 13 relates to the first and second embodiments of the present invention and is a formation diagram showing the formation of a photomagnetic disc driving apparatus.

By the way, in this embodiment, the explanation has been made by using an optical disc as an optical recording medium but, as shown in FIG. 13, it may be a photomagnetic disc driving apparatus using a photomagnetic disc 9'.

In a photomagnetic disc recording/reproducing unit 8' in place of the optical disc recording/reproducing unit 8 in FIG. 8, a photomagnetic disc 9' is used in place of the optical disc 9 and has a photomagnetic head 9b' arranged opposite one surface and a bias magnetic field applying apparatus 61 for applying a bias magnetic field arranged opposite the other surface.

In the above mentioned photomagnetic head 9b', a half prism 9e' is used in place of the polarizing beam splitter 9e in the optical head 9b and a light having passed through this half prism 9e' does not pass through a ¼-wavelength plate 9d but is condensed by an objective lens 9c and is radiated to a photomagnetic disc 9. The returning light from the photomagnetic disc 9' passes through a ¼-wavelength plate 62 rotating the polarizing direction by 45 degrees, passes then through a polarizing beam prism 63 and is received respectively by light detectors 64a and 64b so that a reproducing signal may be obtained by a differential output having passed the lights of these light detecctors 64a and 64b through a differential amplifier 65.

The other formations are substantially the same as in the first embodiment.

It is apparent that, in this invention, working modes different in a wide range can be formed on the basis of this invention without deviating from the spirit and scope of the invention. This invention is not restricted by others than the embodiments defined by the appended claims.

What is claimed is:

1. A controlling information judging method for an optical recording/reproducing apparatus having an optical recording medium comprising:

a first process of recording information in an information recording part of a target recording area;

a second process of reproducing the information recorded in said information recording part of said target recording area in said first process, comparing it with the unrecorded information and judging whether the recorded information coincides with the unrecorded information within a predetermined error correcting range;

a third process of recording said information recorded in said information recording part of said target recording area in an alternating information recording part of said alternating recording area whenever the recorded information does not coincide with the unrecorded information within said predetermined error correcting range, and recording controlling information including address information of said information recording part and of said alternating information recording part in a controlling information recording part;

a fourth process of judging whether or not said controlling information can be reproduced by whether or not said controlling information having reproduced said controlling information recorded in said controlling information recording part by said third process coincides with said controlling information before the recording within a predetermined error correcting range; and a fifth process of recording data memorized in a buffer memory written in said controlling information recording part of said optical recording medium in case said controlling information is judged in the fourth process to be unable to be reproduced, reproducing said data recorded in said information recording part, comparing it with that before the recording, judging whether or not said optical recording medium is abnormal or said optical recording/reproducing apparatus is abnormal by collating said reproduced data to determine whether data to be recorded coincides with said reproduced data within a predetermined error correcting range and initializing said optical recording medium in case said optical recording medium is abnormal.

2. A controlling information judging method according to claim 1 wherein said controlling information is a DDS (Disc Definition Structure) defined in 14, 4, 3, 1 of ISO/IEC JTC1/SC23N292 and SDL (Secondary Defect List) defined in 14, 4, 3, 3 of ISO/IEC JTC1/SC23N292.

3. A controlling information judging method accordin to claim 2 wherein the initialization of said optical recording medium records an initial value in said SDL.

4. A controlling information judging method according to claim 1 or 2 wherein said fourth process repeats a plurality of times the judgment of whether or not said controlling information can be reproduced.

5. An optical recording/reproducing apparatus comprising:

an optical recording medium having a recording area in which information is recorded, an alternating area in which said information is recorded instead of the recording area when said information fails to be recorded in the recording area, and a plurality of control regions in which position information of the recording area having failed to record information and position information of the alternating area in which the information failed to be recorded is recorded instead of said recording area;

recording means for recording the information in a predetermined information recording area of said optical recording medium;

a reproducing means for reproducing said information which is recorded from said predetermined information recording area;

a collating means for collating said information intended to be recorded with said reproduced information obtained by said reproducing means and judging that said information was not correctly recorded in said predetermined recording area;

an alternating processing means for alternating processing to record said information in said alternating area by said recording means in a case it was judged that the information was not correctly recorded by said collating means;

a control region renewing means for renewing the contents of said control regions by said recording means, wherein the renewing is carried out by said alternating processing means, said control region renewing means carries out a renewal operation with at least one region remaining among a plurality of said control regions, renewing remaining control regions when said renewal operation succeeds and making the remaining control regions not renew when said renewal operation fails; and a position information detecting means for detecting said position information recorded in said control region which is renewed by said alternating processing means by using said reproducing means, wherein said collating means further judges, in case said position information is not detected by said position information detecting means, whether or not said reproducing means is normal and whether said reproducing means is abnormal or said optical recording medium is abnormal.

6. An optical recording/reproducing apparatus comprising:

an optical recording medium having a recording area in which information is recorded, an alternating area in which said information is recorded instead of the recording area when said information fails to be recorded in the recording area, and a plurality of control regions in which position information of the recording area having failed to record information and position information of the alternating area in which the information failed to be recorded is recorded instead of said recording area;

recording means for recording the information in a predetermined information recording area of said optical recording medium;

a reproducing means for reproducing said information which is recorded from said predetermined information recording area;

a collating means for collating said information intended to be recorded with said reproduced information obtained by said reproducing means and judging that said information was not correctly recorded in said predetermined recording area;

an alternating processing means for alternating processing to record said information in said alternating area by said recording means in a case it was judged that the information was not correctly recorded by said collating means;

a control region renewing means for renewing the contents of said control regions by said recording means, wherein the renewing is carried out by said alternating processing means, said control region renewing means carries out a renewal operation with at least one region remaining among a plurality of said control regions, renewing remaining control regions when said renewal operation succeeds and making the remaining control regions not renew when said renewal operation fails; and a position information detecting means for detecting said position information recorded in said control region which is renewed by said alternating processing means by using said reproducing means, wherein said collating means records data in at least one of said control regions of said optical recording medium, then compares whether said data reproduced by being read in coincides with the information before being recorded within an error correcting capacity or not and judges whether said optical recording medium is abnormal or said optical recording/reproducing apparatus is abnormal.

7. An optical recording/reproducing apparatus according to claim 6, wherein said collating means judges said optical recording medium to be abnormal in case said position information detecting means temporarily records position information in said plurality of control regions and detects said position information in at least one of said control regions out of said position information temporarily recorded in said plurality of control regions by using said reproducing means.

* * * * *